United States Patent [19]

Winkler

[11] 4,356,201
[45] Oct. 26, 1982

[54] EDIBLE WREATH-SHAPED FOOD CASINGS, ESPECIALLY SAUSAGE CASINGS

[75] Inventor: Bruno Winkler, Weinheim-Oberflockenbach, Fed. Rep. of Germany

[73] Assignee: Naturin-Werk Becker & Co., Weinheim, Fed. Rep. of Germany

[21] Appl. No.: 184,191

[22] Filed: Sep. 5, 1980

Related U.S. Application Data

[60] Continuation of Ser. No. 828,487, Aug. 29, 1977, abandoned, which is a division of Ser. No. 647,977, Jan. 9, 1976, Pat. No. 4,081,562, which is a continuation-in-part of Ser. No. 452,333, Mar. 18, 1974, abandoned.

[30] Foreign Application Priority Data

Mar. 24, 1973 [DE] Fed. Rep. of Germany ....... 2314767

[51] Int. Cl.³ .............................................. A22C 13/00
[52] U.S. Cl. .................................. 426/138; 426/140; 426/277
[58] Field of Search ......................... 426/138, 140, 277

[56] References Cited

U.S. PATENT DOCUMENTS 2,246,236 6/1941 Becker ................................ 426/140
3,535,125 10/1970 Fagan ................................. 426/277

FOREIGN PATENT DOCUMENTS 650526 9/1937 Fed. Rep. of Germany ...... 426/140
670552 1/1939 Fed. Rep. of Germany ...... 426/140

Primary Examiner—Joseph M. Golian
Attorney, Agent, or Firm—Brumbaugh, Graves, Donohue & Raymond

[57] ABSTRACT

Edible wreath shaped food casings are produced by a blow-extrusion method in which the inflated extruded tube is fed onto a series of rotating carrier elements whose peripheral velocity is the same as the rate of discharge of the tube from the extrusion nozzle. The carrier elements may be shaped in a variety of ways but the extruded tube is always led onto the first one tangentially. Lifting guides ensure proper transfer of the tube from one carrier element to the next. The method permits the production of thin-walled casings.

6 Claims, 3 Drawing Figures

EDIBLE WREATH-SHAPED FOOD CASINGS, ESPECIALLY SAUSAGE CASINGS

This is a continuation of application Ser. No. 828,487 of Aug. 29, 1977, now abandoned, which was a division of application Ser. No. 647,977 of Jan. 9, 1976, now U.S. Pat. No. 4,081,562, which, in turn, was a continuation-in-part of application Ser. No. 452,333 of Mar. 18, 1974, now abandoned.

The invention relates to a process and apparatus for the production of edible wreath-shaped food casings, especially sausage casings.

From German Patent Specification No. 650 526 it is already known to produce tubes of animal skin fibre material in the form of a continuous spiral which, when cut into individual parts, produces wreath or ring-shaped sausage casings. The production of the tubes may be effected in one of two ways: firstly, by extrusion (for example, using an eccentrically arranged nozzle core) there is produced a straight casing which is of irregular thickness about its periphery which, on leaving the nozzle, bends as a result of the irregularity of width of the nozzle gap. This irregularly thick casing is thus drawn off spirally in uniform coils, wherein the thicker regions are always subjected to the strongest expansion. Another way of imparting a spiral shape to the casing consists of extruding from a correspondingly shaped nozzle, for example, a bevelled nozzle, a tube with a uniform wall thickness which already has the necessary curvature when it leaves the nozzle, and drawing off the resulting tube spirally. To wind up spirally the only slightly curved casing, or to draw off spirally the casing which leaves the nozzle curved, there is provided a spiral roller conveyor. This conveyor consists of guide rollers which are arranged in concentric coils, and in corresponding layers, around a drive shaft. Some of the guide rollers are driven by the drive-shaft and some are freely rotatable to act as support rollers. In general, whilst being conveyed in the roller conveyor, the tube is dried with warm air. For this purpose the roller conveyor is arranged in a closed drying tunnel. During its transport through the roller conveyor and the drying tunnel, the tube may be sprayed with water-removing agents, tanning solutions and/or plasticisers, and re-dried.

Such a roller conveyor has considerable disadvantages: firstly, because of its many drives, it is a very sensitive device. More significant, however, is the disadvantage which results from the contact between the tube and the guide and support rollers. At these points the tube is thermally damaged because the guide and support rollers assume the temperature of the drying air (approximately 50° C.) whilst the tube temperature is substantially lower, at approximately 25° C., as a result of the evaporating water. To avoid such damage it is necessary to carry out the drying with cooler air, resulting in the drying period being longer and necessitating a longer drying path. Even more serious are the friction problems resulting from the friction between the tube and the guides. As a result of continual milling action at the points of high friction, material is lost and, consequently, the wall thickness of the tube is reduced. The material rubbed off is deposited on the guides. Owing to the intensive milling effect, the tube has to be extruded initially at a corresponding thickness to compensate for the loss in material occurring along the transport path and to ensure that there is an adequate wall thickness and air-tightness in the tube even at the end of the transport path.

To avoid these disadvantages it has already been proposed, in German Patent Specification No. 670 552, to dispense with guiding the tube spirally. In this case a tube coil is produced which is not wound spirally but is drawn off continuously in the direction of its axis without turning, preferably in a straight line, and is if necessary simultaneously dried and hardened. This is effected either by causing the extrusion nozzle to revolve around a transport device which moves forward linearly, in which case the tube coil is formed by the intersection of the revolving nozzle and linearly advancing conveyor device, or by a process in which the casing is extruded from a stationary ring nozzle and is introduced into a guide channel, which carries on from the ring nozzle and is preferably curved in a semi-circle running around the extended longitudinal axis of the nozzle, by means of which channel the tube is delivered spirally on a conveyor device. Such a process, however, is obviously expensive. A revolving nozzle necessitates expensive sealing means. If, on the other hand, the nozzle remains stationary and the guide channel connected to the nozzle rotates, then again there is undesired friction between the tube and the guide rollers of this guide channel.

In the production of straight sausage casings, it has been proposed to avoid damage to the casing during the transport on the roller conveyor by blowing drying air onto all sides of the casing and to convey it, without there being any contact, suspended on an air cushion. Analagously, in the production of wreath-shaped sausage casings according to German Patent Specification No. 676 320 there is used a tubular channel which corresponds to the ring or wreath to be formed. Here the gas outlets are arranged spirally in the wall of the channel and the tube is thus conveyed spirally around the pipe so that it is always disposed above the gas outlets. According to an improvement of this process described in German Patent Specification No. 676 320, the tube does not have to be conveyed spirally around a pipe but is only carried or supported from below and transported free-standing in the shape of a continuous coil. To this end the tube inflated with gas is conveyed over a trough adapted to the curvature of the coil, and the surface of the trough is moved in the direction of circulation of the coil. The tube has therefore to be supported over only a small part of the coil periphery, so that the contact between the coil and a stationary support is reduced, thereby also reducing friction to a great extent. The trough surface preferably consists of adjacently arranged open-link chains. This process is, however, best suited for tubes of very large bore, since in the case of small diameter tubes, the small supporting surface of the trough is not sufficient to guide the coil undamaged through the plant without further support or supporting surfaces. Instead, the coils of thinner tubes break during transport and therefore cannot be transported free-standing. In practice, additional difficulties occur when transporting tubes of large bore, resulting from the construction of the trough surface. It proves very difficult, owing to there being such a small supporting surface, to transport the coils through the plant without trouble in a free-standing condition.

With previously proposed processes and devices it is possible to produce only relatively thick-walled tubes which, on account of their comparatively large wall thickness, could hardly be eaten even if the casing material were in itself edible. As used herein, therefore, edible casings shall mean casings which are both composed of edible material and sufficiently thin, for example, from $8\mu$ to $40\mu$ ($1\mu = 10^{-4}$ cm), to be edible.

It is therefore an object of the invention to provide a method and apparatus for producing a thin-walled and edible wreath-shaped food casing.

In the extrusion process of the invention the casing is conveyed, after leaving the extrusion nozzle, over rotating carrier elements, the peripheral speed of which corresponds to the discharge velocity of the skin from the extrusion nozzle. The required coiling is achieved by conveying the inflated tube around the rotating carrier elements with suitable lifting members causing transfer from one carrier element to the next.

Advantageously, the lifting devices comprise rollers, and are preferably so arranged with respect to the carrier elements that substantially the entire weight of the tube rests on the carrier element, and the lifting rollers are not or not appreciably strained by the weight of the tube. Because the peripheral speed of the carrier elements corresponds to the discharge speed of the tube from the extruder, relative movement between the extruded skin and the carrier element is avoided so that damage caused by friction, such as loss of material and the like, is prevented. In addition, the supporting function of the carrier elements reduces the friction between the tube and the lifting device to a minimum.

The invention accordingly provides a process for the production of edible, wreath-shaped food casings by means of blow-extrusion and sprial draw-off of the inflated extruded casing and, if necessary, drying, handening or tanning and/or plasticising of the casing, in which process the extruded inflated casing is deposited tangentially on peripheral surfaces of carrier elements rotating at substantially the same speed as the casing is discharged from the extrusion nozzle, and is transported from one carrier element to the next by means of guides each preferably in the form of one or more rollers and arranged obliquely to the spiral axis.

Conveyance of the tube from one carrier element to the next is preferably assisted by lateral guides, which also preferably comprise rollers. When smooth running is achieved, that is to say, when the peripheral speed of the carrier element and the discharge speed of the tube from the extruder agree exactly, friction-between the tube and these lateral guides is practically nil.

Further details of the process will be apparent from the following description of apparatus according to the invention.

The invention also provides an extrusion apparatus for the production of edible wreath-shaped food casings, wherein a plurality of rotatable carrier elements are arranged one behind the other on a driven shaft, the carrier elements being arranged to rotate at substantially the same speed as the discharge speed of the tube from the extrusion head, the first carrier element being arranged to receive the extruded tube tangentially and there being provided at least one lifting device between each adjacent pair of carrier elements for guiding the tube therebetween.

The shape of the carrier elements is determined substantially by the spiral shape of the tube. Sharp edges or corners, on which the tube might be damaged, should be avoided. Advantageously, the carrier element is in the shape of a cylindrical disc. In general, the elements will be placed, with coupling members, on a common device shaft.

The width of the carrier element, i.e. the supporting surface for the tube, is not critical, but should be at least as large as the width of the tube. Preferably, the supporting surface of the carrier element is broader than the tube so as to allow a certain play for the tube on the carrier element.

Instead of a cylindrical disc, the or each carrier element may be in the form of a carrier star which rotates around a central axis and has at its arm ends rotatably mounted rollers which carry the casing.

If the casing is dried during transport over the carrier elements, is subsequently moistened again, e.g. by spraying with solutions of tannin, plasticiser and/or dye, and redried, it is subjected to successive longitudinal shinkages and expansions as a result of drying and re-moistening.

Preferably, the carrier elements are conical, each cone tapering outwardly in the direction of the spiral axis, that is to say, in the direction of the next carrier element. As a result of the conical formation a self-regulating action is produced which avoids slack and stresses. The casing always tends to ride up to the highest point of the carrier element which, however, is only possible in so far as skin follows from the previous carrier element. Advantageously a cone of 5° to 25°, preferably 10° to 20° is used.

The guides for lifting the tube from one carrier element to the next are advantageously adjustably arranged so that the angle formed by the spiral axis with respect to the longitudinal axis of the guide may be altered. By this means it is possible to control the pitch of the spiral produced.

Directing the casing onto the next carrier element may be assisted by laterally arranged low friction guides which are preferably in the form of rollers.

The lifting devices and lateral guide devices preferably comprise stainless steel, desirably coated with Teflon to reduce friction, hard rubber, other plastics materials or wood. The lifting devices and the lateral guides are low friction and advantageously mounted on roller bearings.

There is practically no friction on the carrier elements, which rotate at substantially the same speed as the discharge speed of the tube from the extruder, so that the selection of material for these elements is not critical. Preferably, however, the conical or cylindrical carrier elements consist of stainless steel which, if necessary, is coated with plastics. Other materials which may be used include wood and plastics materials.

Preferably, the edible skins are produced from animal skin fibrous material (Collagen). In addition, other edible materials, such as alginate, casein and polyvinyl alcohol, may be used. A collagen composition can be obtained in known manner by treating animal skins followed by a mechanical pulverisation. The edible skins or materials are also sufficiently thin to be edible and, preferably, from $8\mu$ to $40\mu$ thick.

The casing may be produced by the wet or dry spinning method. In the wet spinning process the casing must first of all be fixed in a coagulating bath before it is led to the revolving support elements. In the dry spinning process for collagen compositions with drying substance contents of 6 and 15%, the tube is placed directly on the rotating carrier elements after extrusion from the nozzle.

It is, in principle, possible to make a spiral in the described manner both with a tube of irregular wall thickness and one with uniform wall thickness. A tube of irregular wall thickness is produced, for example, by extrusion from a nozzle with an eccentric core. As a result of the difference in wall thickness, such a tube leaves the nozzle already somewhat curved. In just the same way, it is possible to produce a food casing of uniform wall thickness—e.g. by means of a double rotatable Saitlings extrusion head in which the core and casing rotate in opposite directions—and to guide this tube by means of carrier elements and lifting devices according to the invention and so to curve it spirally. In this case, however, it is necessary to put up with the fact that, conditioned by the originally uniform wall thickness, the tube has on its outer side as a result of the relatively marked expansion, a somewhat smaller wall thickness than on the inside of the wreath.

A process for making edible food-casings in accordance with the invention, and several forms of apparatus in accordance with the invention, will now be described by way of example with reference to the accompanying drawings, in which.

Figure 1:
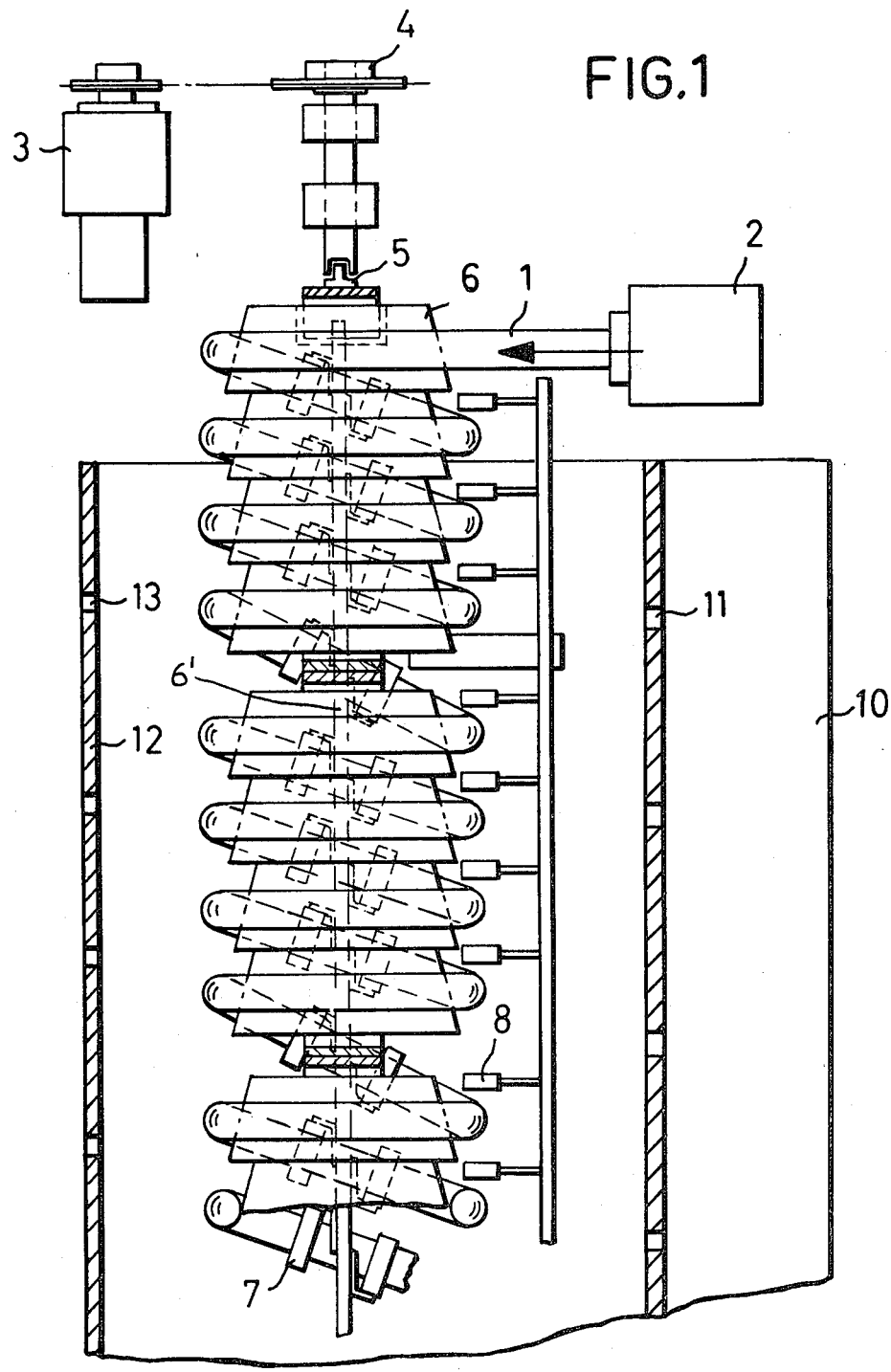
FIG. 1 shows a plan view of one form of apparatus in conjunction with a drying channel.

Referring to FIG. 1, an extruded collagen tube (1) inflated with a gas, leaves an extruder (2) and is led on to the first of a series of rotating conical carrier elements (6). The carrier elements (6) with coupling members, are seated on a carrier shaft (6'). The carrier elements are driven by a carrier shaft (5), with coupling members. The carrier shaft (5) is in turn driven by a chain wheel drive (4) by means of an infinitely variable drive (3). The discharge speed of the extruded skin is substantially equal to the peripheral speed of the carrier element (6). Spiral shaping of the skin casing is produced by lifting rollers (7). Although FIG. 1 shows two lifting rollers, a trouble-free transfer between adjacent carrier elements may also be achieved with one lifting roller. The lifting rollers (7) direct the skin, by reason of their inclined position, onto the next succeeding carrier element. This guiding is assisted by guide rollers (8), which are arranged laterally. During its passage through this transport device, the skin is subjected by drying and remoistening to longitudinal shrinkages and expansions. These alterations in length are compensated for by the conicity of the carrier elements (6). By this arrangement a self-regulating action is produced which avoids slack and stresses. The arrangement permits the production of a very thin-walled spiral-shaped collagen tube suitable for eating. This advantage arises from the fact that practically no rolling friction occurs between the skin and the transport members, and erosion of the material of the collagen tube is therefore avoided.

Figure 2:
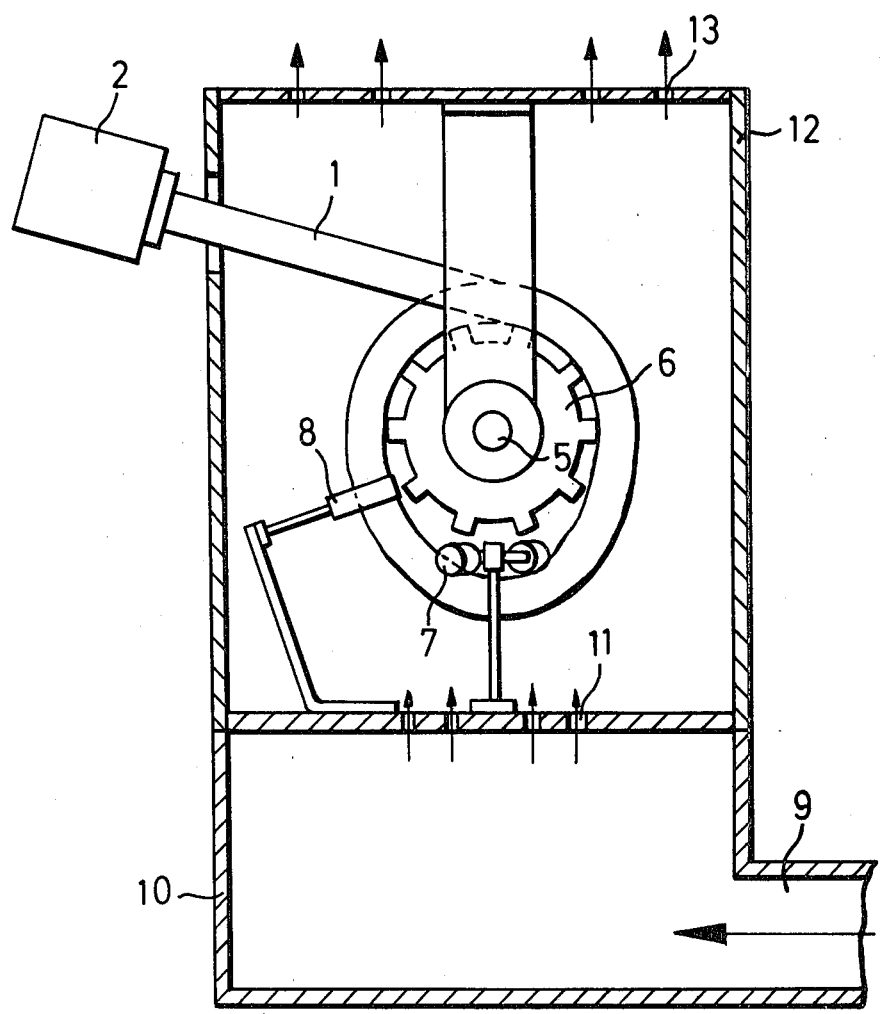
FIG. 2 shows a cross-section through an apparatus similar to FIG. 1 but having a different form of carrier element.

As shown in FIG. 2, the drying air passes via an air conduit (9) into a drying channel (10), and from this through apertures (11) into the skin drying shaft (12). Used drying air passes through discharge apertures (13) into a chamber from which it is blown into the open air by means of exhaust fans.

The carrier element shown in FIG. 2 is provided with elevations or ribs, so as to reduce the contact surface between the carrier element and the tube.

Figure 3:
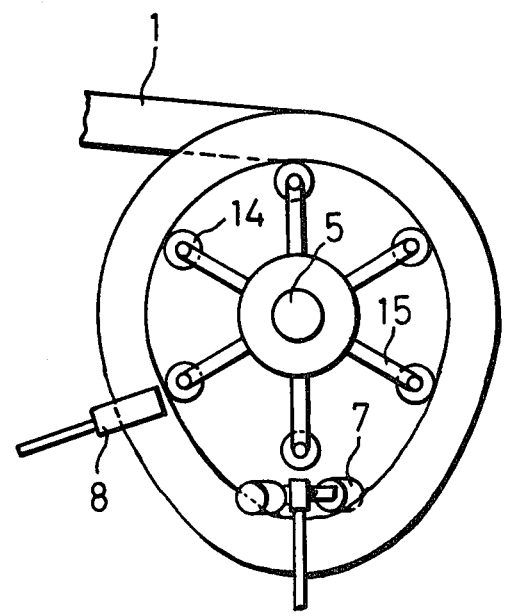
FIG. 3 shows a side elevation of a further form of carrier and transport elements.

The carrier element shown in FIG. 3 takes the form of a carrier star having spokes (15), which rotates about the central axis of the carrier shaft (5). Arranged on the carrier star (15) are rotatably mounted rollers (14) which carry the skin (1). The lifting rollers (7) and the guide rollers (8) have the same function as in FIGS. 1 and 2.

The following Example illustrates the invention:

From a collagen composition produced in known manner and having a collagen content of 9%, based on dry collagen, there is produced through a nozzle with an eccentrically mounted core a slightly curved tube of 30 mm. calibre. The discharge speed of the tube from the extrusion head is 0.2 m/sec. The extruded tube, inflated with air, is placed on the first of 48 conical carrier elements arranged one behind the other on a shaft (for example, as shown in FIG. 1). The shaft with the carrier elements is driven by means of a chain wheel transmission from an infinitely variable drive. Whilst passing the carrier elements, warm air at a temperature of 50° C. is blown in through apertures in the base of a closed housing surrounding the transport device, and used air escapes through apertures in the roof of the housing. The conical carrier elements have a diameter of 130 mm, and the pitch of the cone is 15°.

After passing through the drying chamber, a dried spiral-shaped collagen tube with a ring diameter of 150 mm is obtained which corresponds in curvature to a natural skin. This tube is plasticised by spraying with a 5% aqueous glycerol solution and then wound on rolls or immediately shirred. The rolled up or shirred skin is subsequently hardened by heating for several hours at 70° to 90° C.

The tube may also be hardened by adding a tanning agent to the composition or by spraying the tube with solutions of tanning substances. Examples of tanning agents which may be used include aldehydes, such as formaldehyde, glutaraldehyde, or glyoxal, or metal salts such as alum, ferric sulphate, or aluminium sulphate. Advantageously, any excess tanning agent is removed by washing.

Tanning with solutions of tanning substances may be effected before and/or during the drying process. Softening of the tube may be effected by the addition of plasticisers such as glycerol or sorbitol to the composition, or by moistening the extruded tube with an aqueous solution of a plasticiser after hardening and washing.

I claim:

1. An artificial edible wreath-shaped food casing having a wall thickness in the range of from $8\mu$ to $40\mu$.

2. An edible sausage casing according to claim 1 and consisting of collagen.

3. The casing according to claim 1 wherein the casing has been extruded and inflated tangentially onto the surface of a rotating carrier element having a peripheral speed substantially equal to the speed at which the casing is extruded.

4. The casing according to claim 3 wherein said carrier element rotates 0.5% to 2% faster than the casing is extruded.

5. A casing according to claim 3 wherein the surface of said element has a conical form.

6. A wreath-shaped sausage casing having a wall thickness between $8\mu$ and $40\mu$ formed by blow extrusion from an extrusion nozzle, the extruded casing having been led in the form of a spiral by extruding it tangentially onto the peripheral surface of the first of a succession of truncated conical carrier elements, mounted one after another on a common axis, said carrier elements having been simultaneously rotated with a peripheral speed substantially equal to the discharge speed of the casing from the extrusion nozzle, and the casing having been conveyed from one carrier element of the succession to the next with the aid of guide means arranged obliquely to the axis of rotation of said elements.

* * * * *